Patented Oct. 19, 1937

2,096,660

UNITED STATES PATENT OFFICE 2,096,660

ADHESIVES

Herbert A. Winkelmann, Chicago, Ill., assignor to Marbon Corporation, a corporation of Delaware No Drawing. Application March 18, 1935, Serial No. 11,666. Renewed June 16, 1937

10 Claims. (Cl. 134—17)

The invention relates to adhesives, and particularly to rubber hydrochloride adhesives. It includes adhesive compositions and sheets coated with the compositions. The preferred form is a coated sheet or mask for protecting surfaces against paint or lacquer which is being brushed or sprayed on surrounding surfaces.

It is an object of this invention to produce a non-drying rubber hydrochloride adhesive composition.

It is a further object of this invention to produce a composition which may be coated on paper, fabric or any thin sheet material to give an adhesive sheet which will adhere to a surface on application of pressure, and which will then hold the sheeted material in position on the surface, yet be readily removable and separable therefrom without leaving residuum. Other objects will become apparent on reading the specifications.

The use of rubber hydrochloride makes possible the preparation of water insoluble adhesive coatings easily and economically.

The use of amorphous asymmetrical rubber hydrochloride is preferred. It may be made by reacting rubber with liquefied hydrogen chloride at low temperatures as described in Gebauer-Fuelnegg Patent No. 1,980,396. However, the crystalline rubber hydrochloride such as described in Bradley and McGavack Patent No. 1,519,659, and in the Calvert Patent 1,989,632 may be used with less satisfactory results.

The crystalline rubber hydrochlorides can be put into solution with benzol, ethylene dichloride and some of the other solvents for the amorphous hydrochloride, but in all cases the crystalline rubber hydrochloride jells quicker than the amorphous product, and for some solvents for the amorphous product the crystal product is completely insoluble. In the case of volatile commonly used solvents such as benzol and ethylene dichloride jells are formed with the crystalline rubber hydrochloride in a few hours, while the amorphous compound remains in the sol state indefinitely, making possible the shipment and storage of solutions of amorphous rubber hydrochloride. The jell produced is practically irreversible so that the use of amorphous non-jelling, rubber hydrochloride solutions is of great advantage, not only in the production of compositions suitable for adhesives but for lacquers and many other uses.

In the present invention coating compositions suitable for adhesives are made by dissolving rubber hydrochloride in a volatile solvent and mixing therewith softeners and tack enhancing resins.

The preferred formulae for coating on sheets for masking purposes are as follows, the proportions being by weight:

| | | | |
|---|---|---|---|
| Amorphous rubber hydrochloride (reaction product of liquefied hydrogen chloride on rubber at low temperatures) | 100 | 100 | 100 |
| Chlorinated paraffin oil (light oil) | 150 | 150 | 150 |
| Paracoumarone—indene resin (M. P. 20°–30°) | 75 | 100 | --- |
| Unsaturated modified glycerol phthalate resin | 25 | --- | 100 |

It is to be understood that the invention is not limited to the particular ingredients or particular proportions stated. Even for adhesives suitable for masking purposes the proportions of soft resins may be increased or decreased 50% or more, while for some adhesive purposes the proportions may be varied in greater degree.

The ingredients are mixed with a solvent, the proportion of 6 parts rubber hydrochloride to 100 of a solvent having been found satisfactory. The preferred solvent for amorphous rubber hydrochloride is 3 parts ethylene dichloride, 1 part benzol, 1 part xylol by weight. However, any volatile solvent is suitable as it is removed by evaporation from the finished coating.

Although amorphous rubber hydrochloride is preferred, the crystalline rubber hydrochloride may be used, but with much less satisfactory results due to its tendency to jell.

The preferred resin is P—25, a paracoumarone indene resin of melting point 20°–30° C., made by the Barrett Company. Similar results are obtained with the unsaturated modified glycerol phthalate resins such as Resyl 1103 made by the American Cyanamid Company, which is a viscous liquid of specific gravity 1.07. Any soft resin which has permanent adhesive and tacky qualities may be used, but the resin should not be of a type which dries to a hard solid. In combination with the rubber hydrochloride the soft resins form compositions of improved strength and adhesive qualities, which will adhere strongly to the sheet of paper or other materials on which they are coated, and less strongly to the glass or other surface which they are to protect.

The chlorinated paraffin is preferably a light oil such as Paroil #20 made by the American Products Corporation. When mineral oil is substituted for the chlorinated oil a composition of poor adhesive quality is obtained which, however, is useful for some purposes. The chlorinated oil may be replaced or used in conjunction with butyl stearate or other softeners for rubber hydrochloride. With the amorphous rubber hydrochloride, chlorinated paraffin and butyl stearate have superior plasticizing action.

The composition containing the amorphous rubber hydrochloride in solvents may be shipped and stored for customary time intervals without jelling.

The compositions containing volatile solvents may be coated on any thin sheet and the solvent evaporated to form adhesive sheets, tapes and the like. Any kind of thin sheet may be used but the preferred sheet is paper. The adhesive composition may be coated on fabric, cellophane, gelatin, casein rubber hydrochloride sheets and the like. The paper may be moisture proofed by impregnation with water insoluble materials or by coating with moisture proof material such as rubber hydrochloride. The surface of the paper to be coated may be given a priming coat of chlorinated diphenyl or similar material to aid in the bonding of the composition to the paper, but in general the rubber hydrochloride itself has a tenacious adhering quality to paper. In place of the hydrochlorides other rubber hydrohalides may be substituted. For some purposes rubber halides may also be used.

The term "rubber" as used in the specification and claim includes natural and synthetic rubber, vulcanized rubber, reclaimed and scrap rubber, and equivalent materials.

It is to be understood that numerous details of the processed composition may be varied through a wide range without departing from the principle of the invention and it is, therefore, not intended to limit the patent granted hereon otherwise than necessitated by the prior art.

As an alternative embodiment, unsaturated rubber hydrochloride containing insufficient chlorine to give a non-tacky product may be coated on paper or other sheets with or without plasticizers and resins. With the crystalline rubber hydrochloride a chlorine content of approximately 20% gives a suitable coating while with the amorphous product similar coatings have slightly higher chlorine contents.

What I claim is:

1. An article of manufacture suitable for adhesive purposes comprising a sheet having a coating containing rubber hydrochloride, a chlorinated paraffin and a paracoumarone-indene resin of tacky, adhesive character.

2. An article of manufacture suitable for adhesive purposes comprising a flexible sheet having a coating containing rubber hydrochloride, a chlorinated paraffin, and a glycerol phthalate resin of tacky, adhesive character.

3. An article of manufacture suitable for adhesive purposes comprising a flexible sheet containing a composition composed essentially of approximately 100 parts of amorphous rubber hydrochloride, 150 parts of chlorinated paraffin oil and 100 parts of a low melting point resin from the group consisting of paracoumarone-indene resins and glycerol phthalate resins.

4. A composition composed of approximately 100 parts of amorphous rubber hydrochloride, 150 parts of chlorinated paraffin oil and 100 parts of a paracoumarone-indene resin having a melting point of 20°–30° C.

5. An article of manufacture suitable for adhesive purposes comprising a sheet having a coating containing rubber hydrochloride and a coumarone resin of tacky adhesive quality.

6. An adhesive composition comprising a rubber hydrochloride and a paracoumarone-indene resin having a melting point of approximately 20° to 30° C.

7. A masking tape comprising a thin flexible sheet having a tacky, adhesive coating thereon comprising a rubber hydrochloride.

8. A masking tape comprising a thin flexible sheet having a tacky, adhesive coating thereon comprising a rubber hydrochloride and a resin.

9. A masking tape comprising a thin flexible sheet having a tacky adhesive coating thereon comprising a rubber hydrochloride and a fluid resin.

10. An adhesive tape comprising a thin flexible sheet having a tacky adhesive coating thereon comprising a rubber hydrochloride, a plasticizer therefor, and a resin.

HERBERT A. WINKELMANN.